(12) United States Patent
Sonoda (10) Patent No.: US 8,085,324 B2
(45) Date of Patent: Dec. 27, 2011

(54) SOLID-STATE IMAGING APPARATUS

(75) Inventor: Kazuhiro Sonoda, Yokohama (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 398 days.

(21) Appl. No.: 12/407,917

(22) Filed: Mar. 20, 2009

(65) Prior Publication Data
US 2009/0256939 A1  Oct. 15, 2009

(30) Foreign Application Priority Data

Apr. 11, 2008  (JP) .................................. 2008-103939

(51) Int. Cl.
*H04N 5/335* (2011.01)
(52) U.S. Cl. ....................................................... 348/294
(58) Field of Classification Search ................... 348/294
See application file for complete search history.

(56) References Cited

U.S. PATENT DOCUMENTS

| | | | |
|---|---|---|---|
| 6,573,936 B2 * | 6/2003 | Morris et al. | 348/294 |
| 2008/0225145 A1 | 9/2008 | Sonoda | 348/294 |
| 2008/0291290 A1 | 11/2008 | Sonoda et al. | 348/222.1 |

FOREIGN PATENT DOCUMENTS

JP  2006-025189 A  1/2006

* cited by examiner

*Primary Examiner* — Joseph P Martinez
(74) *Attorney, Agent, or Firm* — Fitzpatrick, Cella, Harper & Scinto (57) ABSTRACT

A solid-state imaging apparatus includes a plurality of A/D converters converting the analog electric signal from the pixel into a digital signal to output the digital signal from an output terminal of the A/D converter; a plurality of register circuits holding the digital signal; and a connecting unit for selectively connecting the output terminal of the A/D converter arranged correspondingly to one column to the input terminal of the register circuit arranged correspondingly to another column, and connecting an output terminal of the register circuit arranged correspondingly to one column to the input terminal of the register circuit arranged correspondingly to another column.

6 Claims, 10 Drawing Sheets

SOLID-STATE IMAGING APPARATUS

BACKGROUND OF THE INVENTION

1. Field of the Invention

The present invention relates to a solid-state imaging apparatus, and more particularly to a solid-state imaging apparatus characterized by including an A/D converter in each column to perform arithmetic operation processing to an obtained plurality of digital signals.

2. Description of the Related Art

The so-called horizontal skipped reading (hereinafter regarded as the same meaning as horizontal skipping operation) has been known with regard to a conventional solid-state imaging apparatus. In the horizontal skipped reading, an analog electric signal, obtained by converting an incident light in each pixel, is read out, for example, in every other column of the pixels arranged in a matrix in a use of requiring a high speed operation, such as in a moving image.

Moreover, Japanese Patent Application Laid-Open No. 2006-025189 discloses that an A/D converting circuit is provided to each column of pixels, and that a digitized signal is arithmetically processed. To put it concretely, the Patent Application describes an image sensor provided with two register circuits in each pixel column to store two different signal levels in the same pixel into the register circuits, which image sensor operates the difference between both of the signal levels in a digital region after the storage of the signal levels.

If a horizontal skipping operation is performed and operations are performed on the basis of the signals held in the plurality of respective register circuits in the circuit configuration disclosed in the aforesaid Japanese Patent Application Laid-Open No. 2006-025189, the A/D converters and the register circuits in the skipped, that is, not read out, columns are not involved in the operations. This state leaves room for an examination pertaining to the aspect of the utilization efficiency of the circuits.

SUMMARY OF THE INVENTION

The present invention is directed to provide a solid-state imaging apparatus capable of improving the utilization efficiency of the circuits thereof and of reducing the offsets of the A/D converters thereof.

An aspect of the present invention is a solid-state imaging apparatus comprising: a plurality of pixels arranged in a matrix wherein each of the pixels converts an incident light into an analog electric signal and outputs the analog signal; a plurality of A/D converters, each arranged correspondingly to each column of the pixels, for converting the analog electric signal from the pixel into a digital signal to output the digital signal from an output terminal of the A/D converter; a plurality of register circuits, each arranged correspondingly to each column of the pixels, for receiving by an input terminal thereof the digital signal outputted from the output terminal of the A/D converter, and for holding the digital signal; a connecting unit for selectively connecting the output terminal of the A/D converter arranged correspondingly to one column to the input terminal of the register circuit arranged correspondingly to another column, and connecting an output terminal of the register circuit arranged correspondingly to one column to the input terminal of the register circuit arranged correspondingly to another column; and an arithmetic operation unit for subjecting to a differential processing the digital signal outputted from each of the output terminals of the plurality of register circuits.

It is possible to reduce the number of the register circuits that do not participate in any operations to improve the utilization efficiency of the circuits even if a horizontal skipping operation is performed and the differential processing is performed by using the digital signals held in the plurality of register circuits. Moreover, it is possible to reduce the offsets of the A/D converters by performing the differential processing.

Further features of the present invention will become apparent from the following description of exemplary embodiments with reference to the attached drawings.

DESCRIPTION OF THE EMBODIMENTS

First Embodiment

The circuit configuration of a solid-state imaging apparatus according to a first embodiment of the present invention will be described first. The operation will be next described that transfers the digital signal held in the register circuit in a column to be read out to the register circuit in another column not to be read out and performs arithmetic operation processing to a plurality of digital signals based on the pixels in different rows in the other column in a horizontal skipping operation.

Figure 1:
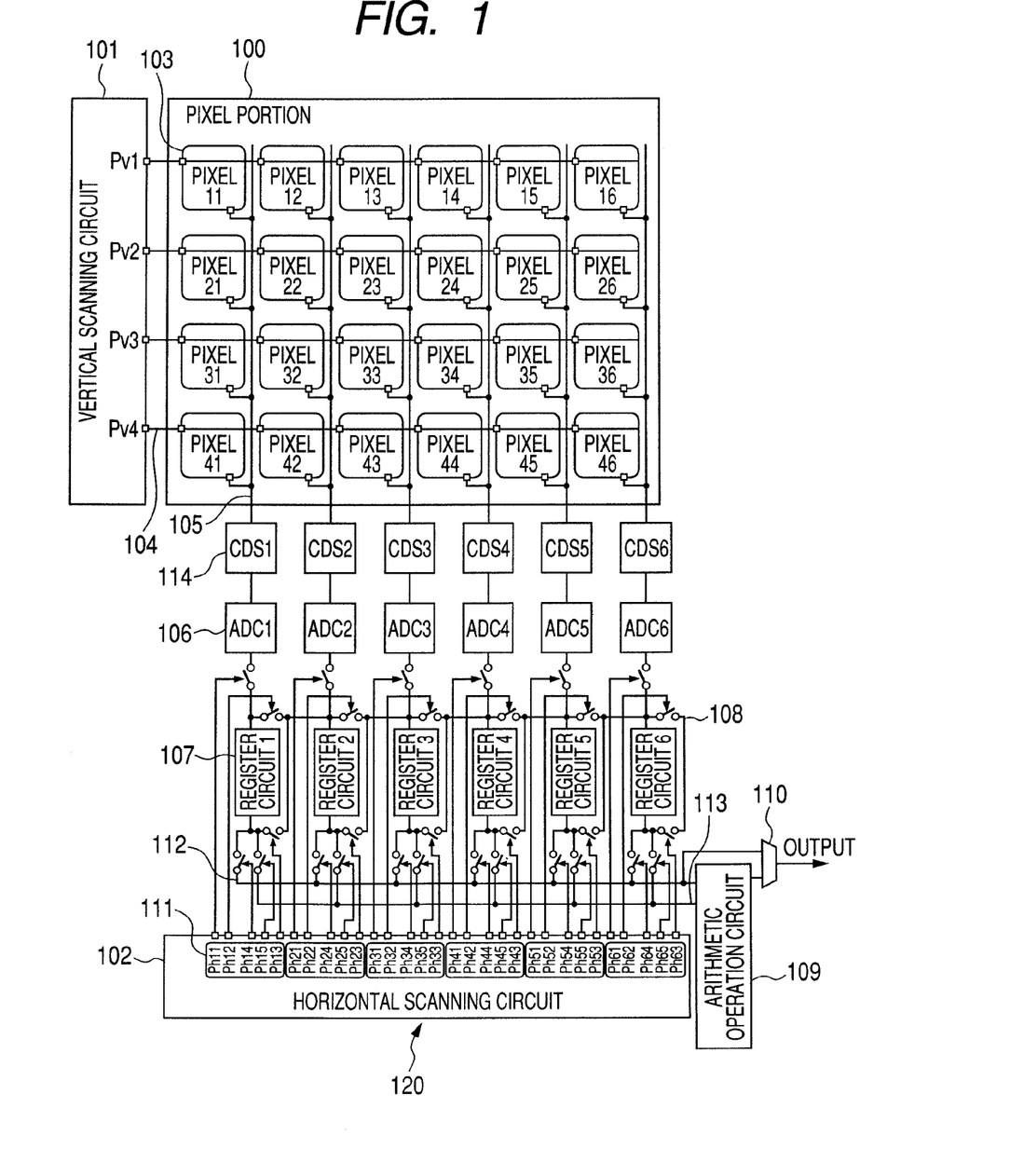
FIG. 1 is a block diagram of a solid-state imaging apparatus according to a first embodiment of the present invention.

FIG. 1 is a block diagram illustrating a solid-state imaging apparatus according to the first embodiment of the present invention. In a pixel portion 100, pixels 103 are arranged in a matrix of six pixels in a horizontal direction and four pixels in a vertical direction, and each of the pixels 103 includes a photoelectric conversion element, such as a photodiode, converting an incident light into an electric charge and outputs the converted electric charge as an analog electric signal. The pixels 103 constituting a row are commonly connected to a vertical scanning circuit 101 with a row selecting line 104, and the six pixels 103 connected to a selected row selecting line 104 are selected at the same time. The pixels 103 in the first row to the fourth row are selected in order by setting row selecting signals Pv1 to Pv4, respectively, to a high level in order.

The analog electric signal output from each of the pixels 103 selected by one of the row selecting lines 104 is input to a CDS circuit 114, which is provided to each of the columns, through each of corresponding vertical output lines 105, to which the pixels 103 in the corresponding column are connected in common. Each of the CDS circuits 114 is a correlated double sampling circuit. The CDS circuit 114 performs differential processing between the level of the noise included in an analog electric signal and the level of the signal to perform noise cancelling. Although the vertical output lines 105 are directly connected to the CDS circuits 114 severally in FIG. 1, amplifiers for amplifying the analog electric signals from the pixels 103 may be connected between the pixel portion 100 and the CDS circuits 114 severally to reduce the influences of the noise components superimposed on the analog electric signals. The analog electric signal of each column that has been subjected to the noise cancelling is input to an A/D converter (ADC) 106 provided to each column. The analog electric signal input to the ADC 106 is converted into a digital signal. The converted digital signal is output from the output terminal of the A/D converter 106, and a register circuit 107 provided to each column of the pixels 103 receives the input digital signal at the input terminal thereof to hold the digital signal therein.

The digital signal held in the register circuit 107 is output from the output terminal of the register circuit 107 to a horizontal output line 112 or 113 by appropriately selecting the register circuit 107 by the horizontal scanning circuit 102. For example, when the horizontal scanning circuit 102 transits column selection signals Ph14, Ph24, . . . to the high level in that order, then the digital signal held in each of the register circuits 107 is output to the horizontal output line 112 in the order of from a register circuit 1 to a register circuit 6 among the register circuits 107. The digital signals output to the horizontal output line 112 are output from the solid-state imaging apparatus through a selector 110.

Moreover, the horizontal scanning circuit 102 makes each of the register circuits 1 to 6 output the digital signal held in each of them to the horizontal output line 113 in order by changing column selection signals Ph15, Ph25, . . . to the high level in that order. When the digital signals are simultaneously output to the horizontal output lines 112 and 113, an arithmetic operation circuit 109, to which the horizontal output lines 112 and 113 are connected in parallel with each other, performs arithmetic operation processing, such as subtraction (difference), averaging, and addition, between the digital signals, and the arithmetic operation circuit 109 outputs the arithmetic operation result from the solid-state imaging apparatus through the selector 110. Although the configuration uses two horizontal output lines 112 and 113 connected to the arithmetic operation circuit 109 here, the configuration of connecting three or more horizontal output lines to the arithmetic operation circuit 109, that is, the configuration of performing the arithmetic operation processing to the digital signals from the three or more horizontal output lines may be adopted.

In the present embodiment, the selector 110 selects and outputs a signal between the signal obtained by performing the arithmetic operation processing to the two digital signals severally read out to the horizontal output lines 112 and 113 and the digital signal read out to the horizontal output line 112 and not subjected to any arithmetic operation processing.

Although the present embodiment divides the six pixel columns in a horizontal direction into two blocks, each composed of three pixel columns, the effect of the present embodiment does not change even if the number of pixel columns per block is increased, or if the six pixel columns are divided into three or more blocks.

Figure 2:
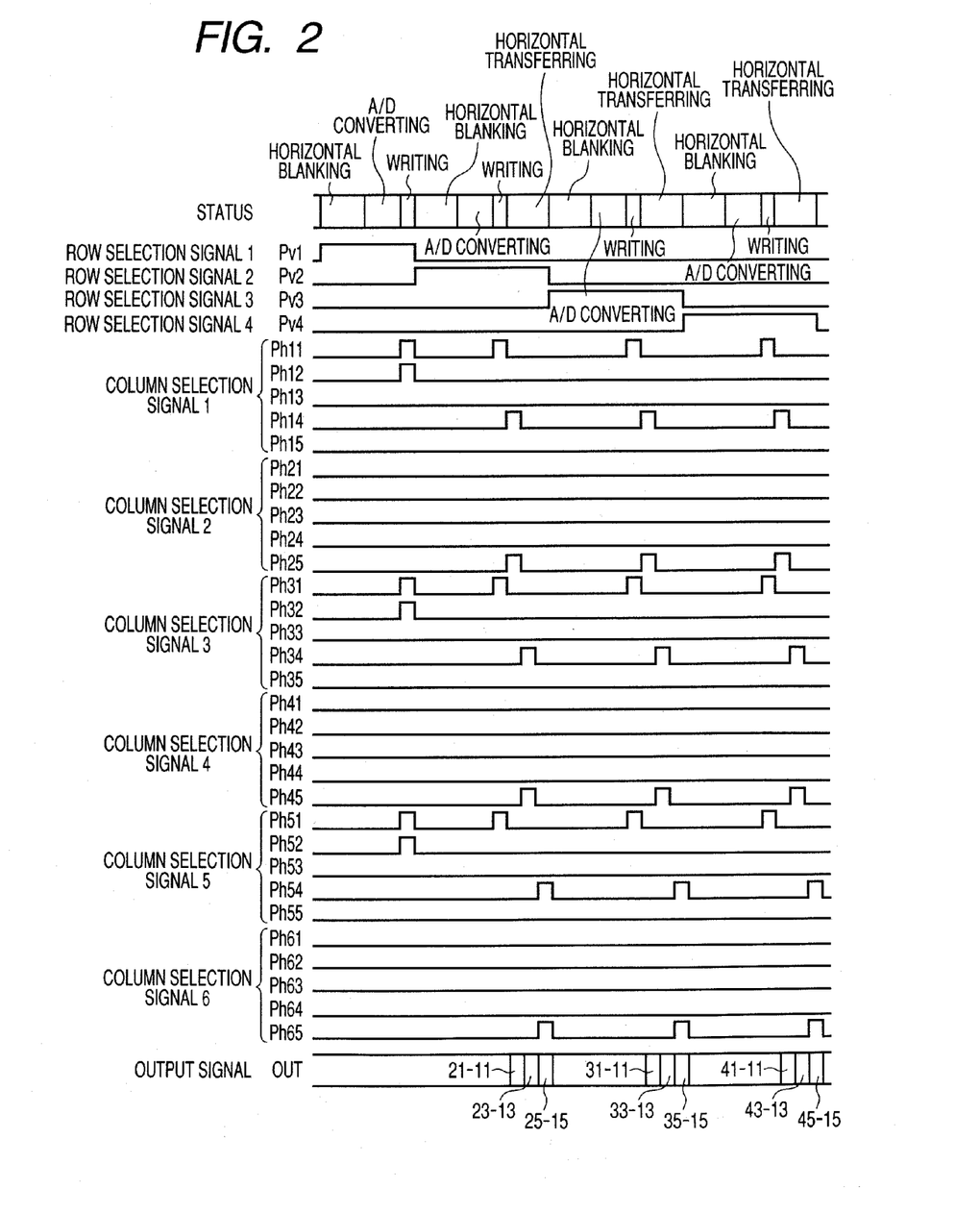
FIG. 2 is a timing chart illustrating a method of driving a solid-state imaging apparatus according to the first embodiment of the present invention.

The method of driving a solid-state imaging apparatus will be described with reference to FIG. 2. In the present embodiment, the digital signals based on the non-effective pixels in a pixel column to be read out are held in the register circuit in a pixel column not to be read out in a horizontal skipping operation, and difference signals between the digital signals held in the register circuit in a pixel column not to be read out and the digital signals based on effective pixels held in the register circuit in the pixel column to be read out are output. To put it concretely, a description will be given by focusing on a first pixel column on the supposition that the pixels in a first row to be selected by the row selecting signal Pv1 are non-effective pixels, which output analog electric signals independent of light quantities, and that only odd pixel columns are read out. It is supposed that the data written in the register circuits 1 to 6 are 0 as an initial state.

Figure 6:
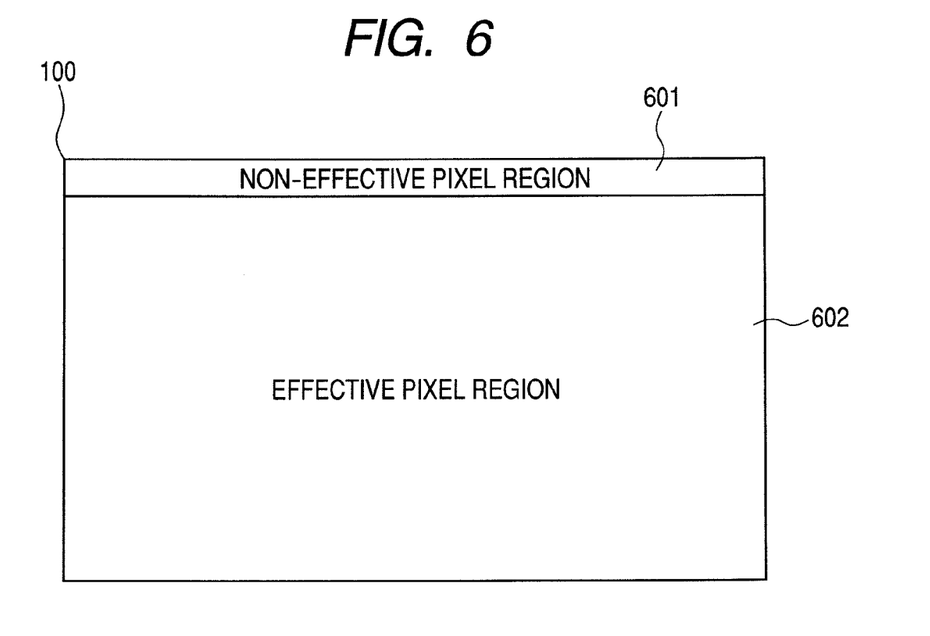
FIG. 6 is a view illustrating a configuration example of a pixel portion according to the first embodiment of the present invention.

As illustrated in FIG. 6, the pixel portion 100 includes a non-effective pixel region 601 and an effective pixel region 602. The non-effective pixel region 601 is a pixel region including non-effective pixels in the first row to be selected by the row selecting signal Pv1. The effective pixel region 602 is a pixel region including effective pixels on and after a second row to be selected by the row selection signals Pv2 to Pv4 and the like. An effective pixel outputs a pixel signal dependent on an incident light, and a non-effective pixel outputs a pixel signal independent of any incident lights. A non-effective pixel is one of a light shielded pixel, which is a pixel having the same circuit configuration as that of an effective pixel with a light shielding film, made of aluminum or the like, covering the surface of the pixel; a pixel having no formed impurity region for accumulating an electric charge; and a pixel whose output signal is fixed to certain reference potential (i.e. the fixed reference potential of the vertical output line 105). The light shielded pixel is an optical black (OB) pixel.

As the effects of the present embodiment, dark current correction, the effect of reducing the offset, which varies in each column, of a read-out circuit, and the effect of reducing the offsets of the ADCs 106 can be obtained in the case of shielding the pixels from any lights. Moreover, although the dark current correction cannot be performed, the effect of reducing the offset, which varies in each column, of the read-out circuit, and the effect of reducing the offsets of the ADCs 106 can be obtained in the case of the pixels having no impurity regions in each of the pixels and the pixels outputting the signals having the fixed reference potential.

A description will be given here by focusing on the pixel column including pixels 11 to 41 with reference to FIG. 2. First, the row selecting signal Pv1 changes to the high level, and the operation in a read-out time period of the first row is started. In horizontal blanking of the status of the solid-state imaging apparatus, an analog electric signal is output from the pixel 11 to the corresponding vertical output line 105, and a CDS circuit 1 among the CDS circuits 114 performs the noise cancelling of the analog electric signal. An ADC 1 among the ADCs 106 performs the analog-to-digital (A/D) conversion of the signal subjected to the noise cancelling in an A/D converting status, and outputs the signal subjected to the A/D converting as a digital signal. In a writing status, column selection signals Ph11 and Ph12 transit to the high level, and thereby the ADC 1 is connected to the register circuits 1 and 2. Thus the digital signal is written in the register circuits 1 and 2.

Successively, the row selection signal Pv2 changes to the high level in turn as the row selecting signal Pv1 transits to the low level, and the read-out operation of the pixels in a second row is started. In the selection time period of the second row, in which the row selection signal Pv2 changes to the high level, the analog electric signal based on the pixel 21 is subjected to noise cancelling and is converted to a digital signal in the horizontal blanking status and the A/D converting status, respectively. In the subsequent writing status, the column selection signal Ph11 changes to the high level, and the digital signal based on the pixel 21, which is an effective pixel, is held in the register circuit 1.

In a horizontally transferring status, the column selection signals Ph14 and Ph25 simultaneously change to the high level, the digital signal based on the pixel 21 and the digital signal based on the pixel 11, which is a non-effective pixel, are output to the horizontal output lines 112 and 113, respectively. These digital signals are input to the arithmetic operation circuit 109, and the signal subjected to the arithmetic operation processing including the processing of subtracting the digital signal based on the no-effective pixel 11 from the digital signal based on the pixel 21 is output from the solid-state imaging apparatus through the selector 110.

Also on and after third row, the operation of holding the digital signal based on an effective pixel in the register circuit 1 in a writing status and of performing a difference arithmetic operation between the digital signal based on the effective pixel and the digital signal based on the non-effective pixel 11 in a horizontally transferring status is repeated.

Figure 3:
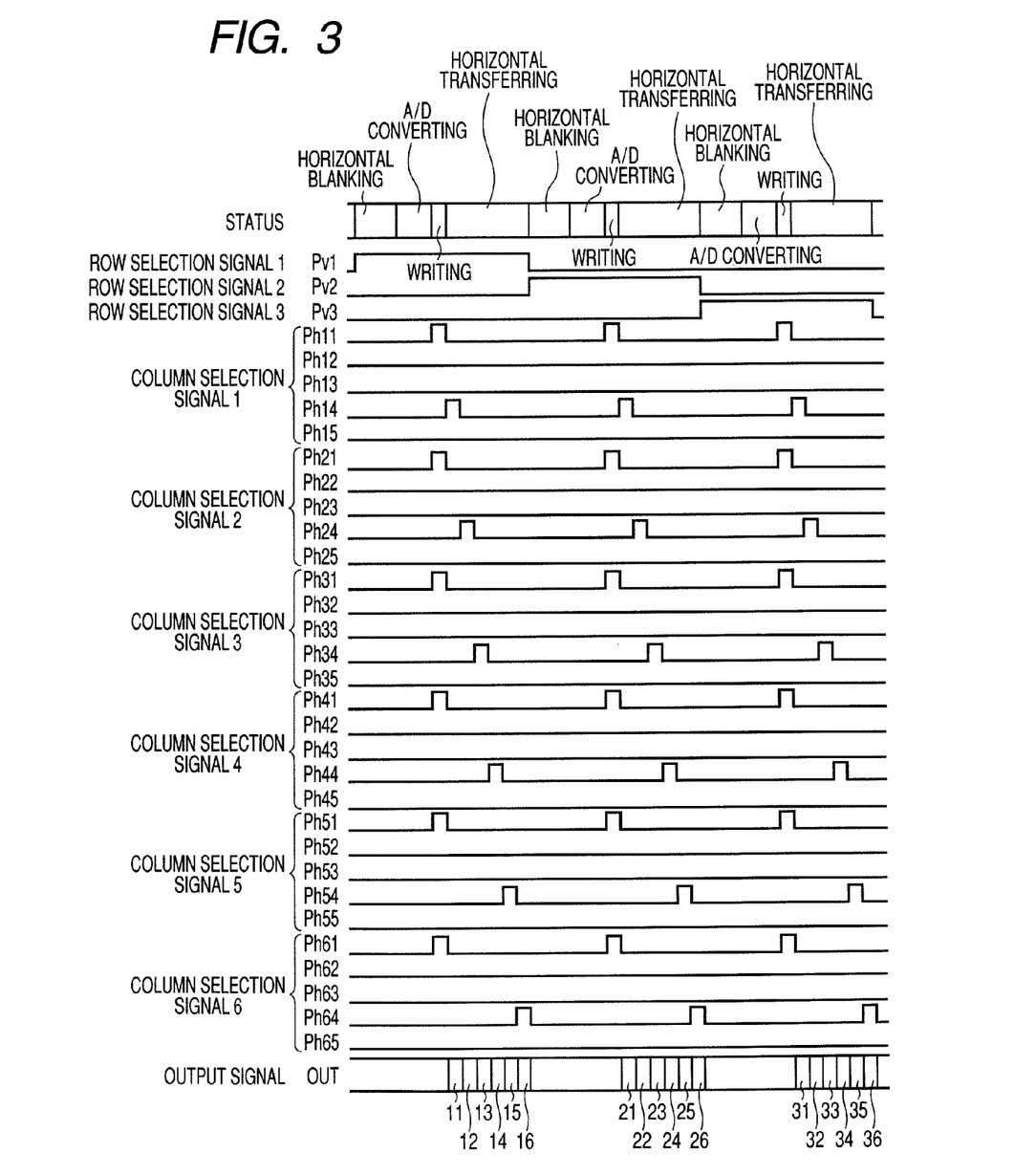
FIG. 3 is another timing chart illustrating the method of driving a solid-state imaging apparatus according to the first embodiment of the present invention.

Next, an operation of performing an output without any skipping and subtraction in a method of driving the solid-state imaging apparatus illustrated in FIG. 1 will be described with reference to FIG. 3. The driving method is a driving method to be performed in the case where a high resolution is required in the photographing of a still image or the like.

A horizontally transferring operation is performed during a time period of selecting the pixel in each row in the present driving method of reading out the signals from all of the pixels 103. That is, in the driving method illustrated in FIG. 2, no horizontally transferring operations are performed in the time period in which the row selecting signal Pv1 is set to the high level to select the pixels in the first row, and, on the other hand, by the present driving method, the horizontally transferring operation is performed during the time period in which the pixels in each row are selected. First, in the horizontal blanking status and the A/D conversion statuses in the first row, the analog electric signals from the pixels 11 to 16 in the first row are subjected to the noise cancelling in the CDSs 114, and the analog electric signals are output from the ADCs 106 as digital signals subjected to the noise cancelling.

The column selection signals Ph11, Ph21, . . . simultaneously change to the high level in the subsequent writing status, and the digital signals output from the ADCs 106 in the respective columns are held in the register circuits 107 in the respective columns.

The column selection signals Ph14, Ph24, change to the high level in the order in the subsequent horizontally transferring status, and the digital signals held in the respective register circuits 107 are sequentially output to the horizontal output line 112. The digital signals output to the horizontal output line 112 are output to the outside of the solid-state imaging apparatus through the selector 110.

Similar operations are performed on and after the second row, and the signals of all of the pixels 103 can be sequentially output in the solid-state imaging apparatus illustrated in FIG. 1.

The present embodiment described above includes a connecting unit for connecting the output terminal of an A/D converter to the input terminal of a register circuit provided in a pixel column different from that of the A/D converter. Consequently, the number of the register circuits that are not involved in a horizontal skipping operation and correction processing using non-effective pixels can be reduced in comparison with that of the registers of the conventional method when the horizontal skipping operation and the correction processing are performed, and the utilization efficiency of the circuits can be improved. The connecting unit in the present embodiment indicates a path that conducts when each of the column selection signals Ph12, Ph22, . . . changes to the high level. Moreover, by performing the drive illustrated in FIG. 3, the signals in all of the pixels 103 of the solid-state imaging apparatus illustrated in FIG. 1 can be read out.

Incidentally, the configuration including the selector 110 is illustrated in the embodiment described above, but the selector 110 may be omitted by configuring the arithmetic operation circuit 109 so as to output a signal without performing any arithmetic processing, i.e. in the case where the signal is output to only either of the horizontal output lines 112 and 113.

Second Embodiment

Although a case where the region of the first row in the pixel portion 100 is set as the non-effective pixel region 601 has been described in the first embodiment, the region composed of a plurality of rows in the upper part of the pixel portion 100 is set as the non-effective pixel region 601 and the region of the pixels 103 in the lower part of the non-effective pixel region 601 is set as the effective pixel region 602 in a second embodiment of the present invention.

For example, a case in which the non-effective pixel region 601 is composed of the pixels 103 in two rows is described. In a selection time period of the first row in which time period the row selecting signal Pv1 is set to the high level, the signal in the non-effective pixel 11 in the first row is subjected to noise cancelling in the CDS circuit 1 and is converted into a digital signal from an analog signal in the ADC 1 similarly in the driving method illustrated in FIG. 2. Next, the column selection signals Ph11 and Ph12 change to the high level, and the output signal of the ADC 1 is held in the register circuits 1 and 2.

In the selection time period of the second row, in which period the row selection signal Pv2 is set to the high level, an analog electric signal is read out from the non-effective pixel 21 in the second row in the horizontal blanking status, and the read analog electric signals is subjected to noise cancelling in the CDS circuit 1. In the subsequent A/D converting status, the output signal of the CDS circuit 1 is converted into a digital signal from an analog signal in the ADC 1. Next, in the subsequent writing status, the column selection signal Ph11 changes to the high level, and the digital signal based on the non-effective pixel 21 is held in the register circuit 1.

In the subsequent horizontally transferring status, the column selection signals Ph14 and Ph25 simultaneously change to the high level, and the digital signal based on the non-effective pixel 21 and the digital signal based on the non-effective pixel 11 are output to the horizontal output lines 112 and 113, respectively. These digital signals are input to the arithmetic operation circuit 109 and are subjected to the averaging of the digital signals based on the non-effective pixels 11 and 21. Then, the averaged digital signal is held in the arithmetic operation circuit 109.

In the subsequent time period of the third row, in which time period the row selection signal Pv3 takes the high level, the digital signal based on the pixel 31 in the effective pixel region 602 is input to the arithmetic operation circuit 109. Thereupon, the arithmetic operation circuit 109 subtracts the mean value of the signals based on the non-effective pixels 11 and 21 of two pixels, which have been held in the time period in which the row selection signal Pv2 are set to the high level, from the signal based on the effective pixel 31.

According to the present embodiment, the non-effective pixels in a plurality of rows are read out into the register circuits 107, and the arithmetic operation circuit 109 averages the signals of the non-effective pixels in the plurality of rows and holds the averaged signal therein. Incidentally, the signals based on the non-effective pixels in three or more rows may be averaged. After that, when the digital signal based on a pixel in the effective pixel region 602 is input to the arithmetic operation circuit 109, then the arithmetic operation circuit 109 subtracts the held mean value of the signals based on the non-effective pixels in the plurality of rows from the signal based on the effective pixel.

Third Embodiment

Figure 10A:
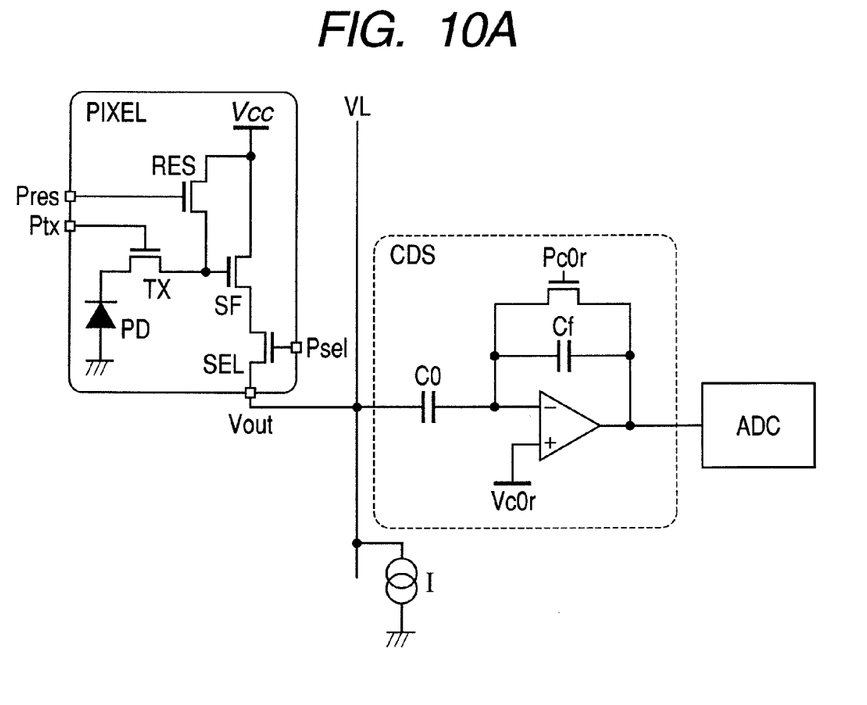
FIGS. 10A and 10B are a diagram illustrating a configuration example of circuits according to an embodiment of the present invention and a timing chart for describing the operation of the configuration example.

FIG. 10A illustrates a more concrete configuration of each of the pixels 103 and the CDS circuits 114. The pixel includes a transfer switch TX, a reset switch RES, an amplifying unit SF, and a selection switch SEL besides a photoelectric conversion element PD. A case where each of the transfer switch TX, the reset switch RES, the amplifying unit SF, and the selection switch SEL is composed of a metal oxide semiconductor (MOS) transistor is exemplified here.

The photoelectric conversion element PD is, for example, a photodiode, and can accumulate the electric charge according to an incident light. The transfer switch TX conducts when a signal Ptx changes to the high level, and the electric charge accumulated in the photoelectric conversion element PD transfers to a floating diffusion region, which is a node including the gate terminal of the amplifying unit SF. When the selection switch SEL conducts by a signal Psel, the amplifying portion SF forms a source follower circuit together with a constant current source I. In this state, the electric potential according to that of the gate terminal of the amplifying portion SF appears on a vertical output line VL. When the reset switch RES conducts by a signal Pres, the floating diffusion region is reset according to a power source voltage Vcc.

Figure 10B:
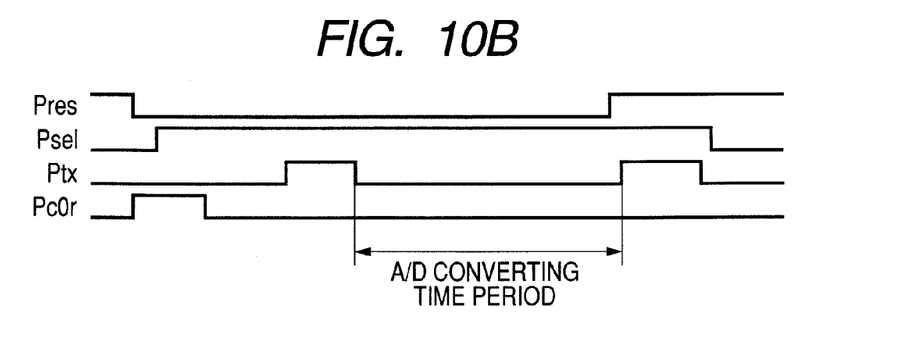

The operations of the circuits illustrated in FIG. 10A are described with reference to FIG. 10B. FIG. 10B corresponds to the horizontal blanking status and the A/D converting status in FIGS. 2 and 3.

First, in a time period in which the signal Pres is set to the high level, the floating diffusion region is in a reset state. After that, when the signal Pres changes to the low level and a signal Pc0r changes to the high level, the voltage of the terminal of a clamping capacitor C0 which terminal connected to the inverting input terminal of an operational amplifier becomes a voltage Vc0r owing to the imaginary ground of the operational amplifier. Next, when the signal Psel changes to the high level, the electric potential according to the resetting of the floating diffusion region appears on the vertical output line VL, and then the change of the signal Pc0r to the low level clamps the electric potential.

Next, when the signal Ptx changes to the high level, the electric charge accumulated in the photoelectric conversion element PD is transferred to the floating diffusion region, and the electric potential appearing on the vertical output line VL changes. Since the signal Pc0r is the low level here, only the changed quantity from the electric potential according to the resetting of the floating diffusion region is input to the inverting input terminal of the operational amplifier. Consequently, the noise components caused by the amplifying unit SF and the reset switch RES can be removed. Furthermore, the configuration illustrated in FIG. 10A has an advantage capable of multiplying the aforesaid changed quantity of the electric potential by the gain determined by the ratio of the capacitance value of the clamping capacitor C0 to the capacitance value of the feedback capacity Cf.

After the signal Ptx has changed to the low level, an A/D converting operation, that is, an A/D converting status, by an ADC is started.

After that, the signals Pres and Ptx change to the high level, and the photoelectric conversion element PD is reset according to the power source voltage Vcc. Then, the signal Psel changes to the low level, and the operation pertaining to the pixel 11 ends. The operation of the register circuit may be the one in accordance with those illustrated in FIGS. 2 and 3.

Fourth Embodiment

Figure 7A:
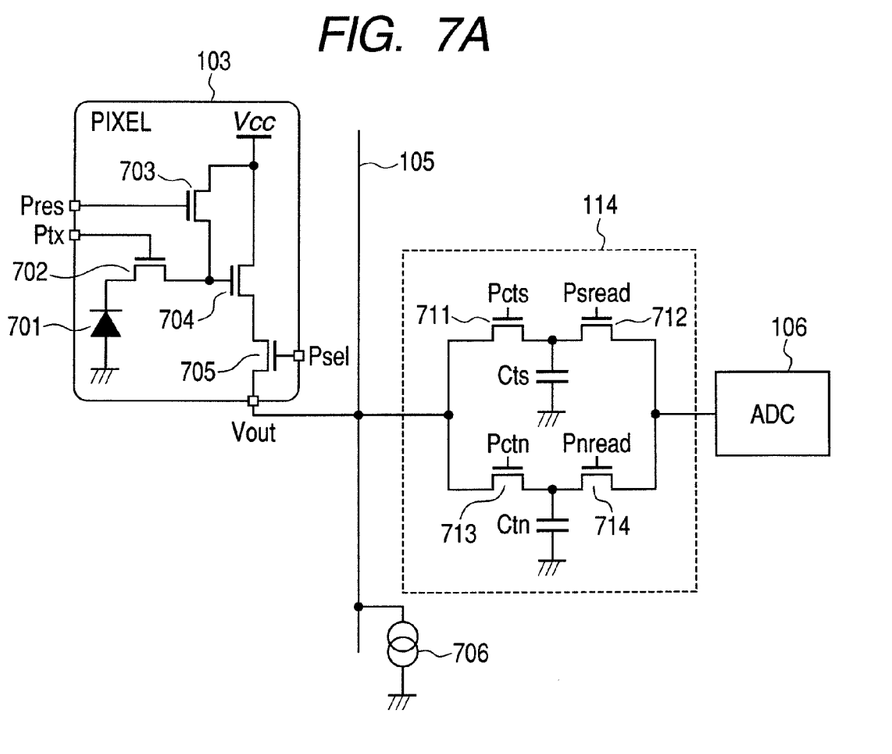
FIGS. 7A and 7B are a diagram illustrating a configuration example of a pixel and a signal holding unit according to the fourth embodiment of the present invention and a timing chart for describing the operation of the configuration example.
Figure 7B:
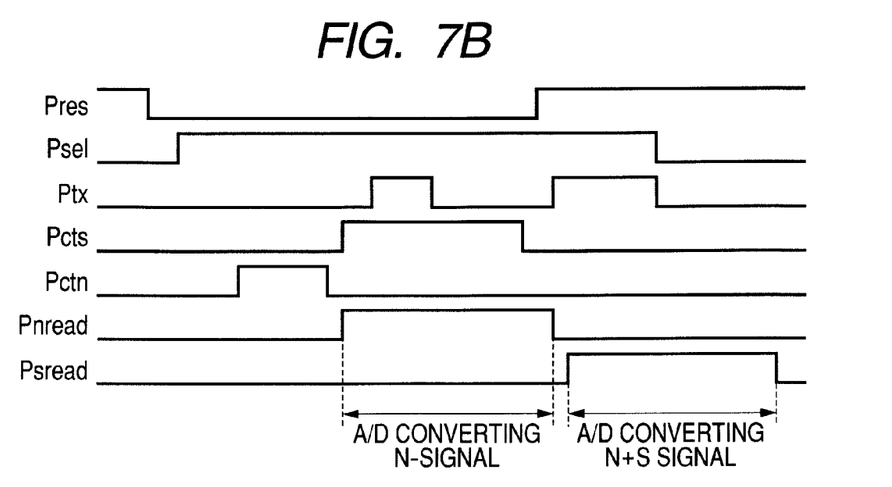

FIG. 7A is a diagram illustrating a configuration example according to a fourth embodiment of the present invention, and FIG. 7B is a timing chart for describing the operations of the circuits illustrated in FIG. 7A. In the following, the respects of the present embodiment that are different from those of the first embodiment will be described. In the present embodiment, the noises arising from pixels are removed. Moreover, a MOS field effect transistor will be simply referred to as a transistor in the following. It is supposed that the signals based on the pixels in odd columns are subjected to A/D converting, and that the signals based on the pixels in even columns are not subjected to A/D converting here. A description will be given on the suppositions that the pixel 103 illustrated in FIG. 7A corresponds to the pixel 11 in FIG. 1.

The pixel 103 includes a photoelectric conversion element 701 and n-channel transistors 702-705. The photoelectric conversion element 701 is, for example, a photodiode. A signal holding unit 115 includes n-channel transistors 711 to 714 and capacitors Cts and Ctn. A current source 706 is connected to a vertical output line 105. The photoelectric conversion element 701 converts an incident light into an electric charge to generate an electric signal, and accumulates the generated electric signal in the impurity region thereof. The signals illustrated in FIG. 7B are generated by, for example, the vertical scanning circuit 101.

First, the operations in the time periods corresponding to a horizontal blanking status and an A/D converting status are described. When a signal Pres changes to the high level, then the n-channel transistor 703 is turned on, and the floating diffusion region, which is the gate of the transistor 704, is reset to have the power source voltage Vcc.

Next, when a signal Psel changes to the high level, then the transistor 705 is turned on. Hereby, the transistor 704 and a constant current source 706 constitute a source follower circuit, and the transistor 704 amplifies a voltage according to the gate voltage thereof to output the amplified voltage to the vertical output line 105. As illustrated in FIG. 7B, since the signal Psel changes just after the resetting of the gate of the transistor 704, a noise signal according to the gate potential of the transistor 704 at this time is output to the vertical output line 105.

Next, when a signal Pctn changes to the high level and then changes to the low level, the transistor 713 is temporarily turned on, and the noise signal output on the vertical output line 105 is held in a capacitor Ctn. After the signal Pctn has changed to the low level, signals Pcts and Pnread change to the high level. When the signal Pcts changes to the high level, then the transistor 711 is turned on, and a capacitor Cts is electrically connected with the vertical output line 105. When the signal Pnread changes to the high level, then a transistor 714 is turned on, and the noise signal held in the capacitor Ctn is output to an ADC 106. During the time period in which the signal Pnread takes the high level, an A/D converting operation of the noise signal (N-signal) is performed, and the digital signal based on the noise signal is held in the register circuit 2.

Next, when the signal Ptx changes to the high level, then the transistor 702 is turned on, and the electric charge generated by the photoelectric conversion element 701 is transferred to the gate (floating diffusion region) of the transistor 704. The electric potential according to the gate potential of the transistor 704 appears on the vertical output line 105, and the electric potential is held in the capacitor Cts as a pixel signal including a noise signal.

After the signal Pcts has changed to the low level, the signal Pres changes to the high level. After that, the signal Ptx changes to the high level. At this time, since the signal Pres is also set to the high level, the electric charge accumulated in the photoelectric conversion element 701 is reset to the power source voltage Vcc. When the signal Ptx changes to the low level again, the photoelectric conversion element 701 changes its state to the one capable of accumulating the electric charge according to an incident light. Moreover, when a signal Psread changes to the high level after the signal Pnread has changed to the low level, the transistor 712 is turned on, and the pixel signal held in the capacitor Cts is output to the ADC 106. During the time period in which the signal Psread takes the high level, an A/D converting operation of the pixel signal (S signal) is performed, and the digital signal based on the pixel signal is held in the register circuit 1.

After that, the digital signals held in the register circuits 1 and 2 are output, and the arithmetic operation circuit 109 performs the differential processing of the digital signals.

As described above, a noise signal and a pixel signal are severally read out at a different timing, and the noise signal is subtracted from the pixel signal. Thereby, the noise signal in the pixel signal can be cancelled. A driving method of performing subtraction processing between the noise signal and the pixel signal that have been obtained from the same pixel by transferring the noise signal to the register circuit in a column that is not read out in a horizontal skipping operation is described here.

Figure 4:
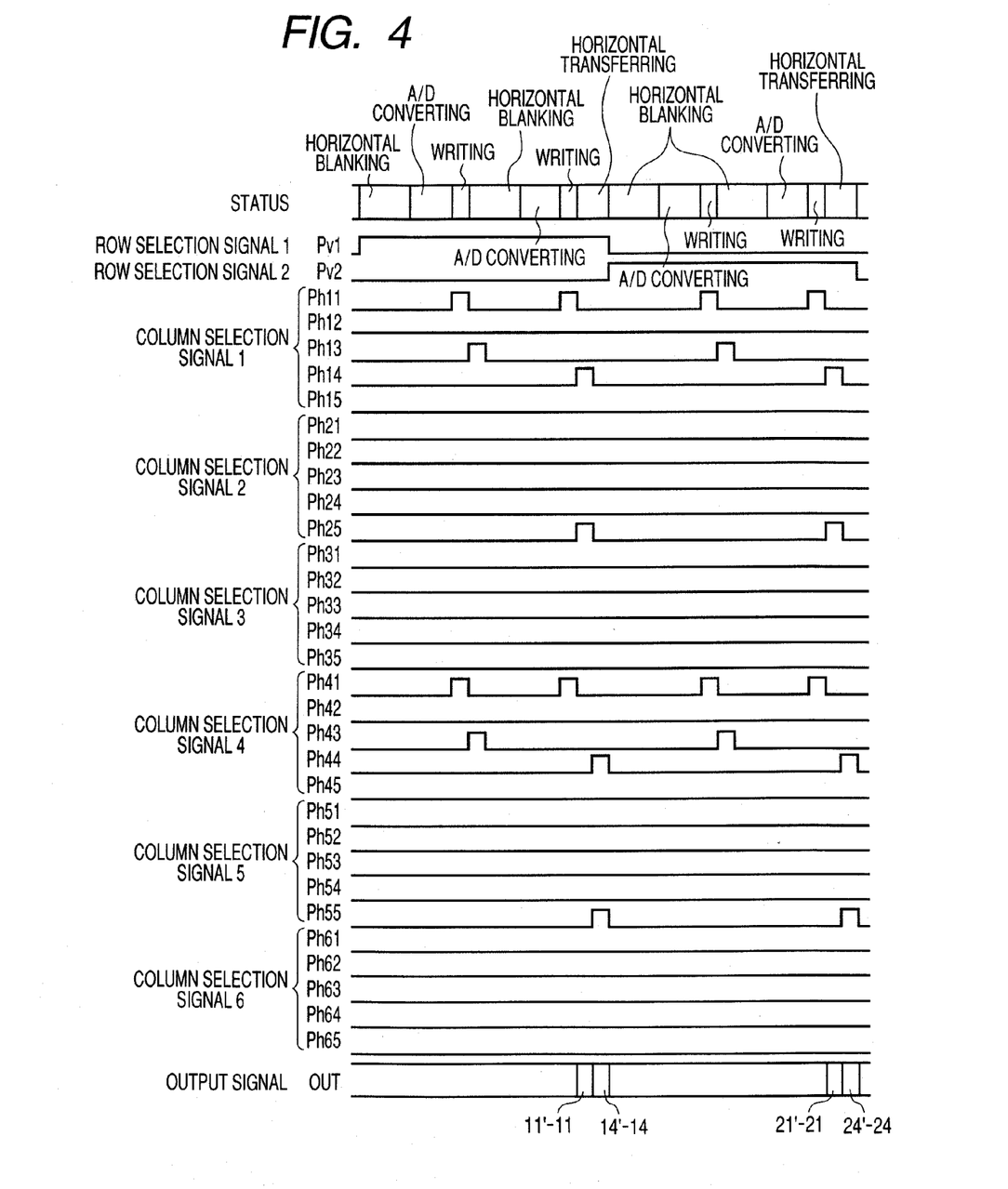
FIG. 4 is a timing chart illustrating a method of driving a solid-state imaging apparatus according to a fourth embodiment of the present invention.

The timing chart illustrated in FIG. 4 illustrates the driving method of the present embodiment, and illustrates the horizontal skipping operation by which the pixels in second, third, fifth and sixth columns of the pixels composed of six pixels in each of the horizontal directions and four pixels in each of the vertical directions are not read out. With regard to the pixels in the first and fourth columns to be read out, two signals obtained by performing the read-out operations of the noise signal and pixel signal of the same pixel are subjected to subtraction processing and are output to the outside of the solid-state imaging apparatus.

With regard to the first column, the pixel 11 in the first row is selected during the time period in which the row selecting signal Pv1 is set to the high level in FIG. 4. The noise signal of the pixel 11 in the first row is read out to the ADC 1 in a first horizontal blanking status of the first row, and the read out analog electric signal is converted into a digital signal in the subsequent first A/D converting status as described above. The digital signal based on the pixel 11 is held in the register circuit 1 in a first writing status.

Next, the pixel signal in the first row is read out to the ADC 1 in a second horizontal blanking status as described above. In parallel with the reading-out, a column selection signal Ph13 changes to the high level, and the noise signal held in the register circuit 1 in the first writing status is transferred to the register circuit 2. The pixel signal read out in the second horizontal blanking status is converted into a digital signal in the subsequent second A/D converting status, and is held in the register circuit 1 in a second writing status.

The pixel signal and noise signal held in the register circuits 1 and 2, respectively, are output to the horizontal output lines 112 and 113, respectively, in the subsequent horizontally transferring status, and are subjected to subtraction processing in the arithmetic operation circuit 109 to generate a pixel signal with the noise thereof cancelled. For example, in the notation of 11'-11 in the row of Output Signal in FIG. 4, 11' indicates the pixel signal in the pixel 11, and 11 indicates the noise signal of the pixel 11.

An image with the noise thereof cancelled can be obtained by performing the operation similar to the one described above on and after the second row.

The present embodiment described above includes the connecting unit to connect the output terminal of a register circuit to the input terminal of the register circuit in a pixel column different from that of the former register circuit. Hereby, it is possible to reduce the number of the register circuits that are not involved in a horizontal skipping operation in comparison with the conventional technique in the case of obtaining an image subjected to noise cancelling while performing the horizontal skipping operation, and consequently the utilization efficiency of the circuits can be improved. Incidentally, the connecting unit in the present embodiment indicates a path to connect different register circuits with each other when a column selection signal Phn3 transits to the high level pertaining to an nth column in FIG. 1.

The A/D conversion of a noise signal and the A/D conversion of a pixel signal are performed in one horizontal blanking period. Either of the A/D converting may be performed first. After the A/D converting of the noise signal, the noise signal is written in the register circuit 1, and before the A/D converting of the pixel signal the noise signal is transferred to the adjacent register circuit 2. The pixel signal and the noise signal are held in the register circuits 1 and 2, respectively, and then the pixel signal and the noise signal are transferred to the horizontal output lines 112 and 113, respectively. The arithmetic operation circuit 109 subtracts the noise signal from the pixel signal. If unused ADCs 106 are turned off, it is advantageous for electric power saving. The present embodiment can reduce the offsets of the ADCs 106 by subtracting noise signals from pixel signals.

Fifth Embodiment

Figure 8:
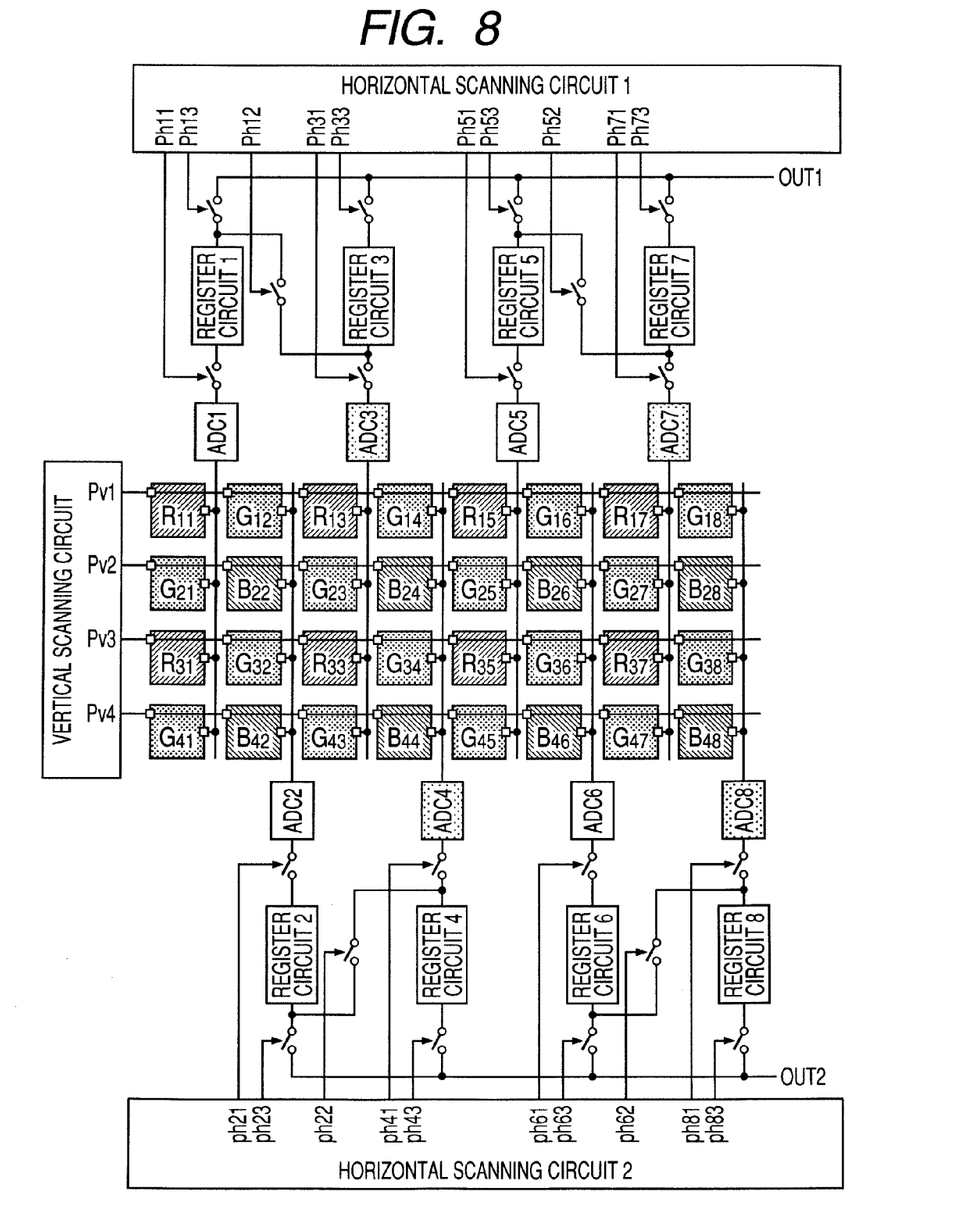
FIG. 8 is a timing chart illustrating a method of driving a solid-state imaging apparatus according to a fifth embodiment of the present invention.

FIG. 8 is diagram illustrating a configuration example of a solid-state imaging apparatus according to a fifth embodiment of the present invention. In the following, the respects of the present embodiment that differ from those of the fourth embodiment will be described. The horizontal scanning circuit 102 in FIG. 1 is divided into a first horizontal scanning circuit 102a and a second horizontal scanning circuit 102b. The first horizontal scanning circuit 102a controls the connecting units (switches) 108 at the preceding stage and the subsequent stage of the register circuits 1, 3, 5, and 7 of the odd numbers. The second horizontal scanning circuit 102b controls the connecting units (switches) 108 at the preceding stage and the subsequent stage of the register circuits 2, 4, 6, and 8 of the even numbers. Red (R), green (G), and blue (B) color filters are provided to the pixels 103, and red signals, green signals, and blue signals can be generated. A horizontal output line OUT1 corresponds to the horizontal output line 112 of FIG. 1, and a horizontal output line OUT2 corresponds to the horizontal output line 113 of FIG. 1. Moreover, as the operation of the fifth embodiment, the solid-state imaging apparatus is configured not to have the CDS circuits 114 similarly to the configuration of the fourth embodiment, and the fifth embodiment performs the A/D conversion of each of the noise signals and the pixel signals based on the pixels 103.

Either of the A/D conversion may be performed first at the time of performing the A/D conversion of a noise signal and the A/D conversion of a pixel signal. As an example, after the A/D conversion of the noise signal, the signal Ph11 is changed to the high level, and then the noise signal is written in the register circuit 1. Next, the signal Ph12 is changed to the high level before the A/D conversion of the pixel signal, and the noise signal is transferred from the register circuit 1 to the adjacent register circuit 3. The pixel signal and the noise signal are held in the adjacent register circuits 1 and 3, respectively, and then the pixel signal and the noise signal are horizontally transferred to the horizontal output line Out1 in order. The order of the outputting of the signals are: the pixel signal of a pixel R11→the noise signal of the pixel R11→the pixel signal of a pixel R15→the noise signal of the pixel R15 . . . . The arithmetic operation circuit 109 at the subsequent stage includes a delay circuit and subtraction circuit, and delays the pixel signal and subtracts the noise signal from the pixel signal. If the unused ADC 3, ADC 7, ADC 4, and ADC 8 are turned off, then it is advantageous for electric power saving. The present embodiment can reduce the offsets of the ADCs 106 by subtracting noise signals from pixel signals.

FIG. 10A illustrates the configuration examples of the more concrete circuits. That is, if the operation illustrated in FIG. 10B is performed when the circuits have the configuration illustrated in FIG. 10A, then noise signals and pixel signals can be sequentially subjected to A/D conversion.

First, in a time period in which the signal Pres is set to the high level, the floating diffusion region is reset. After that, when the signal Psel changes to the high level, the voltage level corresponding to the noise signal is input to the ADC, and the A/D conversion of the noise signal is performed. Next, when the signal Ptx is changed to the high level, the electric charge accumulated in the photoelectric conversion element PD is transferred to the floating diffusion region, and the voltage level corresponding to the pixel signal including the noise signal is input to the ADC. Then, the A/D conversion of the pixel signal can be performed during the time period until the floating diffusion region is reset by the signal Pres.

Sixth Embodiment

Figure 9:
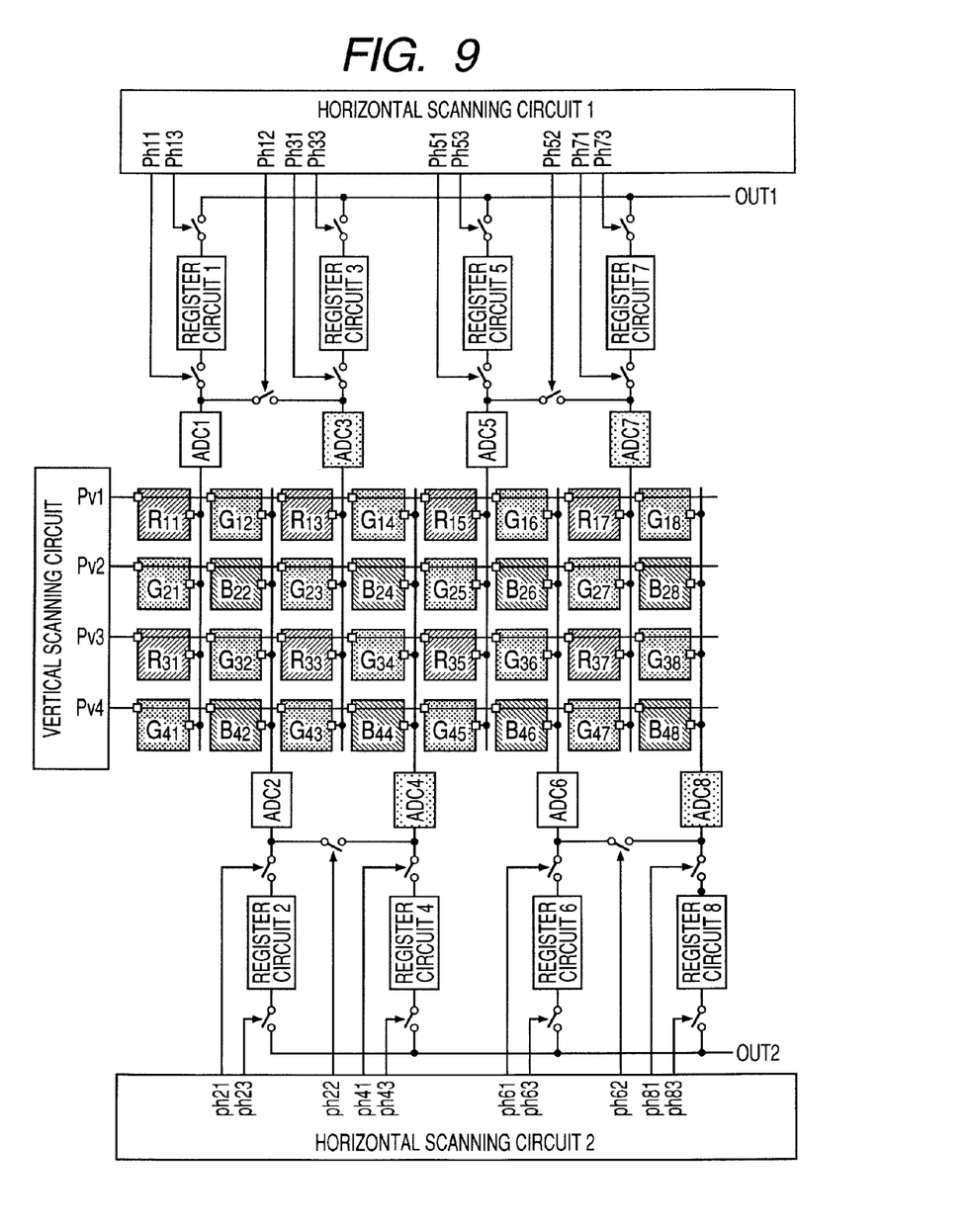
FIG. 9 is a timing chart illustrating a method of driving a solid-state imaging apparatus according to a sixth embodiment of the present invention.

FIG. 9 is a diagram illustrating a configuration example of a solid-state imaging apparatus according to the sixth embodiment of the present invention. In the following, the respects in which the present embodiment differs from the fifth embodiment will be described. The A/D conversion of a noise signal and the A/D conversion of a pixel signal are performed. Either of the noise signal and the pixel signal may be first subjected to the A/D conversion. The noise signal is first subjected to the A/D conversion, and then the signals Ph12 and Ph31 are changed to the high level to write the noise signal output from the ADC 1 to the register circuit 3. Next, the pixel signal is subjected to the A/D conversion, and then the signal Ph11 is changed to the high level to write the pixel signal output from the ADC 1 to the register circuit 1. The pixel signal and the noise signal are held in the adjacent register circuits 1 and 3, respectively, and are horizontally transferred to the horizontal output line OUT1 in order. The order of outputting the signals is: the pixel signal of the pixel R11→the noise signal of the pixel R11→the pixel signal of the pixel R15→the noise signal of the pixel R15 . . . . The arithmetic operation circuit 109 at the subsequent stage includes a delay circuit and a subtraction circuit, and delays a pixel signal to subtract a noise signal from the delayed pixel signal. If the unused ADCs, ADC 3, ADC 7, ADC 4 and ADC 8, are turned off, it is advantageous for electric power saving.

Seventh Embodiment

Figure 5:
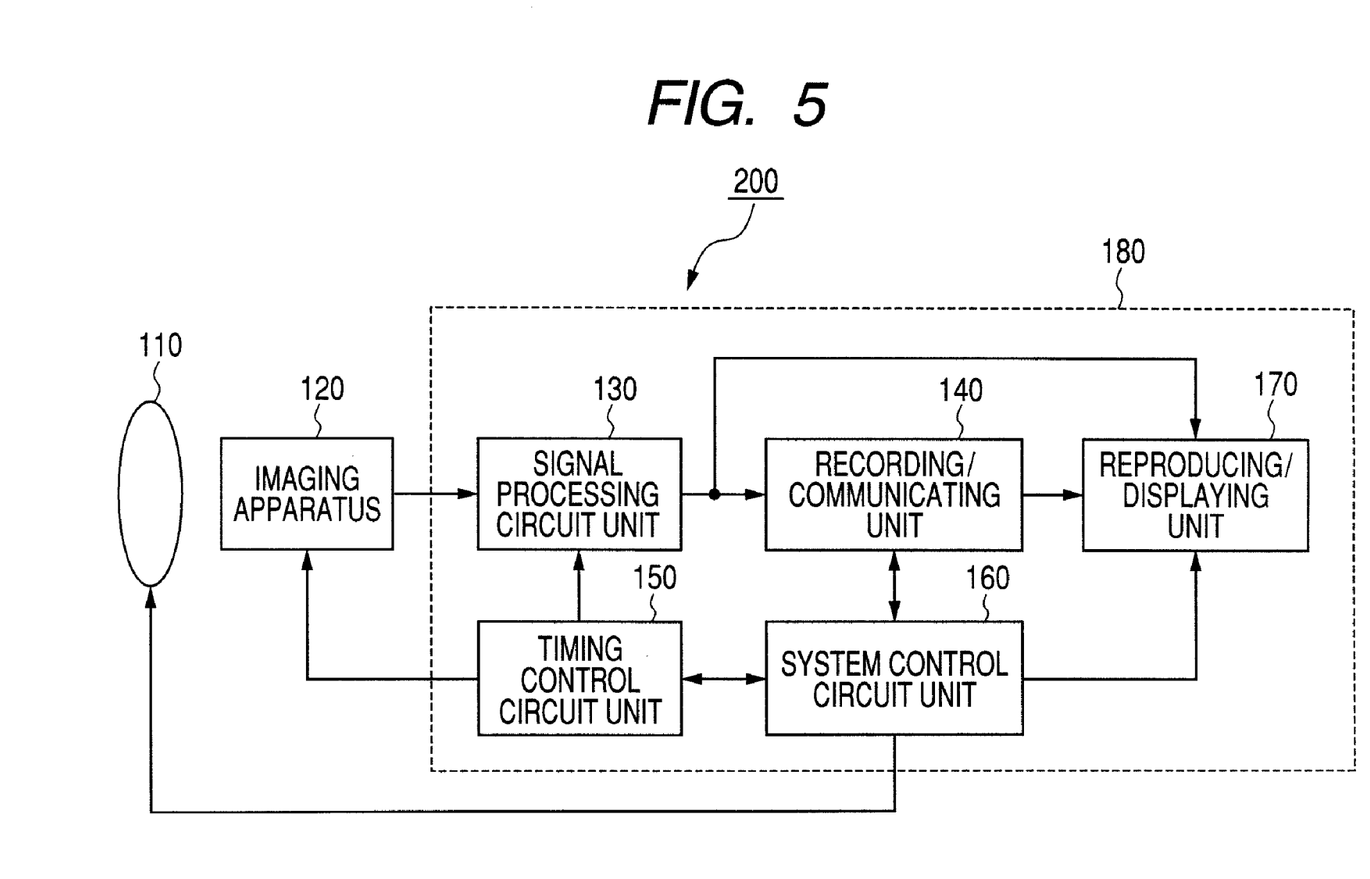
FIG. 5 is a block diagram of an imaging system according to a seventh embodiment of the present invention.

The schematic configuration and schematic operation of an imaging system 200 according to a seventh embodiment of the present invention will be described with reference to FIG. 5. FIG. 5 is a configuration diagram of the imaging system 200 according to the present embodiment.

The imaging system 200 includes an optical system 110, a solid-state imaging apparatus 120, and a signal processing unit 180. The signal processing unit 180 includes a signal processing circuit unit 130, a recording/communicating unit 140, a timing control circuit unit 150, a system control circuit unit 160, and a reproducing/displaying unit 170.

The optical system 110 forms an image of a subject on a pixel arrangement surface, which is an imaging surface of the solid-state imaging apparatus 120.

The solid-state imaging apparatus 120 is any of the solid-state imaging apparatus according to the first to sixth embodiments. The solid-state imaging apparatus 120 converts the image of the subject formed on the pixel arrangement surface into an image signal. The solid-state imaging apparatus 120 reads out the converted image signal from the pixel arrangement to output the read image signal to the signal processing circuit unit 130.

The signal processing circuit unit 130 performs the signal processing, such as the compression processing of image data, of the image signal supplied from the solid-state imaging apparatus 120 in conformity with a previously determined method. The signal processing circuit unit 130 supplies the image data subjected to the signal processing to the recording/communicating unit 140 and the reproducing/displaying unit 170.

The recording/communicating unit 140 sometimes records the image data supplied from the signal processing circuit unit 130 to a not-illustrated recording medium and sometimes transmits the image data to a similarly not-illustrated external apparatus. Alternatively, the recording/communicating unit 140 sometimes reads out image data from a recording medium to supply the read-out image data to the reproducing/displaying unit 170 and sometimes receives a predetermined instruction from a not-illustrated input unit to supply the received instruction to the system control circuit unit 160.

The reproducing/displaying unit 170 displays the image data supplied from the signal processing circuit unit 130 or the recording/communicating unit 140 on a display device.

The timing control circuit unit 150 supplies a signal for controlling the timing of driving the solid-state imaging apparatus 120 and assumes a role as a mode switching unit. For example, the timing control circuit unit 150 sometimes supplies a signal for driving the solid-state imaging apparatus 120 in the mode of performing a horizontal skipping operation and sometimes supplies a signal for driving the solid-state imaging apparatus 120 in the mode of reading out the signals of all the pixels.

The system control circuit unit 160 receives the information of a predetermined instruction from the recording/communicating unit 140. The system control circuit unit 160 controls the optical system 110, the recording/communicating unit 140, the reproducing/displaying unit 170, and the timing control circuit unit 150 in conformity with predetermined instructions. For example, the system control circuit unit 160 controls the optical system 110, the recording/communicating unit 140, the reproducing/displaying unit 170, and the timing control circuit unit 150 in accordance with each of the all pixel read-out mode and the skipping read-out mode.

According to the present embodiment, similarly to the first to sixth embodiments, digital signals can be held in the register circuits provided in the columns of the pixels from which signals are not read out at the time of a skipping operation. Hereby, the number of the register circuits that are not involved in a horizontal skipping operation when the horizontal skipping operation is performed can be reduced, and consequently arithmetic operation processing, such as subtraction (difference) and averaging, can be realized with the utilization efficiency of the circuits improved.

The configuration including the arithmetic operation circuit 109 and the selector 110 in the solid-state imaging apparatus 120 has been mentioned in any of the embodiments described above, but the arithmetic operation circuit 109 and the selector 110 are not necessarily provided in the solid-state imaging apparatus 120. For example, the arithmetic operation circuit 109 and the selector 110 may be provided in the signal processing circuit unit 130 in FIG. 5. In this case, the area of the solid-state imaging apparatus 120 on the semiconductor substrate thereof can be reduced, and the effects mentioned above can be obtained. It is to have the configuration capable of holding digital signals in the register circuits provided in the columns having the pixels from which no signals are read out at the time of performing a horizontal skipping operation that is important in the embodiments described above.

In the solid-state imaging apparatus 120 of the first to sixth embodiments, each of the plurality of pixels 103 converts an incident light into an analog electric signal to output the converted analog electric signal. The pixels 103 are arranged in a matrix. The plurality of A/D converters (ADCs) 106 is provided in the respective columns in the plurality of pixels 103, and each of the A/D converters 106 converts the analog electric signals from the pixels 103 into digital signals to output the converted digital signals from the output terminal thereof. Each of the plurality of register circuits 107 is provided in each of the columns of the plurality of pixels 103, and receives the digital signals output from the output terminal of the A/D converter 106 with the input terminal of the register circuit 107 to hold the digital signals. Each of the connecting units 108 connects the output terminal of one of the A/D converters 106 to the input terminal of the register circuit 107 provided in one of the columns of the plurality of pixels 103 which column is different from the column to which the A/D converter 106 is provided. Alternatively, each of the connecting units 108 connects the output terminal of one of the register circuits 107 to the input terminal of the register circuit 107 provided in the column of the plurality of pixels 103 which column is different from the column of the register circuit 107. The arithmetic operation unit (arithmetic operation circuit) 109 can perform the differential processing to the digital signal output from each of the output terminals of the plurality of register circuits 107 and can output the processed digital signal.

In the first to third embodiments, the plurality of pixels 103 includes effective pixels, each of which outputs an analog electric signal dependent of an incident light, and non-effective pixels, each of which outputs an analog electric signal independent of an incident light. The plurality of register circuits 107 severally holds the digital signals of the effective pixels and the digital signals of the non-effective pixels. The arithmetic operation unit 109 performs the differential processing between each of the digital signals of the effective pixels and each of the digital signals of the non-effective pixels, all of the digital signals held in the plurality of register circuits 107.

Each of the non-effective pixels has the same circuit configuration as that of each of the effective pixels, and includes a light shielding film covering the surface of the non-effective pixel. Moreover, each of the effective pixels may include an impurity region for accumulating the electric charge of a converted analog electric signal, and the non-effective pixel may not include the impurity region for accumulating the electric charge of the converted analog electric signal. Moreover, the non-effective pixel may output an analog electric signal fixed to a reference potential.

In the fourth to sixth embodiments, the pixels 103 sequentially output reset analog electric signals (reset signals) at the time of resetting and pixel analog electric signals (pixel signals) dependent on incident lights. The plurality of register circuits 107 severally holds the digital signals converted from the reset analog electric signals and the pixel analog electric signals. The arithmetic operation unit 109 performs differential processing to the digital signals converted from the reset analog electric signals and the pixel analog electric signals, which digital signals are held in the plurality of register circuits 107.

As described above, according to the first to seventh embodiments, even if a horizontal skipping operation is performed and differential processing is performed by the use of the digital signals held in a plurality of register circuits, the number of the register circuits that are not involved in the operation can be reduced, and the utilization efficiency of the circuits can be improved. Moreover, the offsets of the A/D converters can be reduced by performing the differential processing.

Incidentally, all of the embodiments described above only illustrate the examples of the concretization for implementing the present invention, and these embodiments should not be interpreted to limit the scope of the present invention. That is, the present invention can be implemented in various forms without departing from the spirit and the principal features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-103939, filed Apr. 11, 2008, which is hereby incorporated by reference herein in its entirety.

What is claimed is:
1. A solid-state imaging apparatus comprising:
a plurality of pixels arranged in a matrix wherein each of the pixels converts incident light into an analog electric signal and outputs the analog signal;

a plurality of A/D converters, each arranged correspondingly to one of columns of the pixels, and for converting the analog electric signal from one of the pixels into a digital signal to output the digital signal from an output terminal of the A/D converter;

a plurality of register circuits, each arranged correspondingly to one of the columns of the pixels, for receiving by an input terminal thereof the digital signal outputted from the output terminal of one of the A/D converters, and for holding the digital signal;

a connecting unit for selectively connecting the output terminal of the A/D converter arranged correspondingly to one column to the input terminal of the register circuit arranged correspondingly to another column, and connecting an output terminal of the register circuit arranged correspondingly to one column to the input terminal of the register circuit arranged correspondingly to another column; and an arithmetic operation unit for subjecting to a differential processing the digital signal outputted from each of the output terminals of the plurality of register circuits.

2. The solid-state imaging apparatus according to claim 1, wherein the plurality of pixels form an effective pixel region from which the analog electric signal is outputted based on the incident light, and a non-effective pixel region from which the analog electric signal is outputted not based on the incident light, the plurality of register circuits hold the digital signal based on the analog electric signal from the non-effective pixel region and the digital signal based on the analog electric signal from the effective pixel region, and the arithmetic operation unit subjects to the differential processing the digital signals from the effective pixel region and the non-effective pixel region held by the plurality of register circuits.

3. The solid-state imaging apparatus according to claim 2, wherein the non-effective pixel region has the same circuit structure as that of the effective pixel region, and a surface of the non-effective pixel region is covered with a light shielding layer.

4. The solid-state imaging apparatus according to claim 2, wherein the effective pixel region includes an impurity concentration region for accumulating an electric carrier for generating the analog electric signal, and the non-effective pixel region does not include the impurity concentration region for accumulating the electric carrier for generating the analog electric signal.

5. The solid-state imaging apparatus according to claim 2, wherein the non-effective pixel region outputs the analog electric signal fixed to a reference potential.

6. The solid-state imaging apparatus according to claim 1, wherein the pixel outputs sequentially a reset analog electric signal at a reset, and a pixel analog electric signal based on incident light, the plurality of register circuits hold the digital signals generated by converting the reset analog electric signal, and the pixel analog electric signal, and the arithmetic operation unit subjects to the differential processing the digital signals held by the plurality of register circuits.

* * * * *